Nov. 15, 1949     W. D. ABBOTT ET AL     2,488,365

ALL-AROUND MOTOR VENTILATION

Filed Jan. 15, 1947

WITNESSES:
Edward Michaels

INVENTORS
Ward D. Abbott &
Frank C. Russell.
BY
ATTORNEY

Patented Nov. 15, 1949

2,488,365

UNITED STATES PATENT OFFICE 2,488,365

ALL-AROUND MOTOR VENTILATION

Ward D. Abbott, Orchard Park, N. Y., and Frank C. Russell, Pittsburgh, Pa., assignors to Westinghouse Electric Corporation, East Pittsburgh, Pa., a corporation of Pennsylvania Application January 15, 1947, Serial No. 722,150

7 Claims. (Cl. 172—36)

Our invention relates to adequate and economical motor-ventilation, and it has particular relation to the problem of ventilating the larger frame-sizes in a new line of squirrel-cage industrial motors, although certain principles of the invention are applicable also to other machines.

Tests of known cooling methods have failed, particularly in the larger frame-sizes of drip-proof protected squirrel-cage motors and splash-proof protected squirrel-cage motors, when an attempt has been made to rerate these motors in an effort to obtain the highest possible rating for any given frame-size. These tests have shown temperatures which were far above the temperatures which are allowable on protected motors, thus indicating the necessity for some new approach to the cooling-problem.

A known type of single-end-ventilated motor has brackets having ventilating-openings in only its lower hemisphere, so that the top hemisphere of each bracket is imperforate, thus rendering the motors drip-proof; and internal blower-means are provided for drawing air in through one bracket, passing it axially through the motor, around the stator-core, and expelling it from the other bracket. This motor has the disadvantage that most of the air will go straight through the lower half of the motor, so that the upper half of the motor is much less efficiently ventilated, than the lower half.

It is an important object of our present invention to provide an efficient blower-arrangement, coupled with a novel method of air-inlet and outlet that exhausts the air entirely around the periphery of the bracket at the exhaust-end of the motor, hoods being added, in spaced relation to the brackets, for making the motor either drip-proof or splash-proof. The uniform discharge, at all points around the periphery, makes it possible to bring the same quantity of air over the back of the core, across the top as well as the bottom.

In some cases, extra rotor ventilation is desirable, and it is a further object of our invention to provide also a rotor-ventilating system, having a uniform peripheral discharge which combines with the uniform peripheral discharge of the stator-ventilating system.

Figure 1:
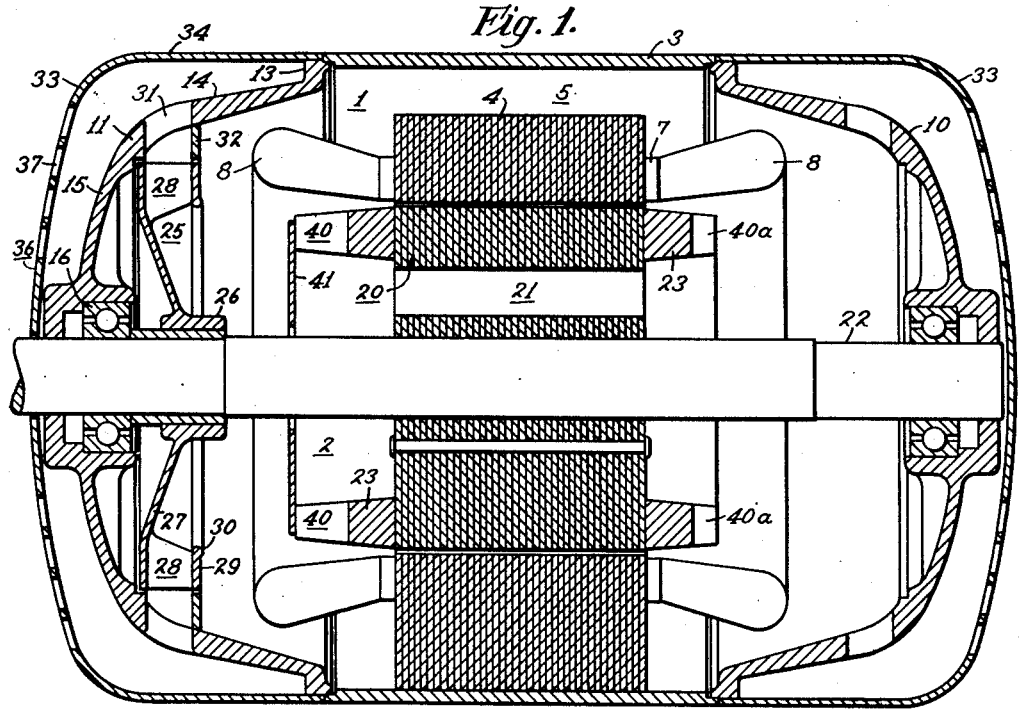
Figure 2:
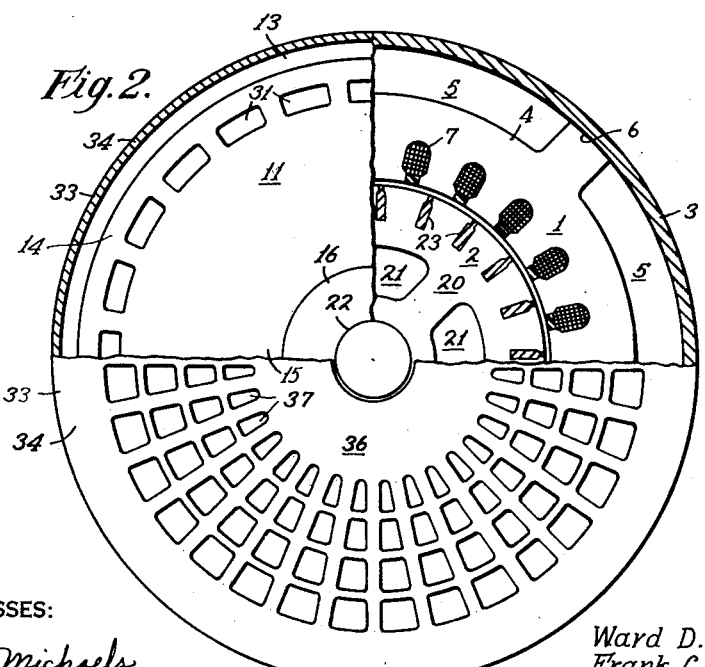

With the foregoing and other objects in view, our invention consists in the parts, structures, combinations, and systems hereinafter described and claimed, and illustrated in the accompanying drawing, wherein:

Figure 1 is a longitudinal sectional view of a motor embodying our invention in a preferred form of embodiment, and Fig. 2 is an end view, with portions broken away, and partly in transverse section across the motor shown in Fig. 1.

Our invention is illustrated in connection with a dynamo-electric machine, in the form of a protected squirrel-cage motor comprising a stator-member 1 and a rotor-member 2. The stator-member has a stator-frame 3, which is illustrated in the form of a strong rigid frame-ring, which comprises an outer enclosure-member which is spaced radially from the major portion of the outer periphery of the stator-core 4, thus defining a plurality of axially extending stator-ventilating ducts 5 which admit of an axial airflow over the stator-core from one end of the core to the other. The laminations of the stator-core 4 make contact with the stator-frame 3 at a plurality of spaced points 6 (Fig. 2) about the outer periphery of the stator-laminations, within the inside of the frame-ring, the stator-laminations being spaced from the inside of the frame-ring at other peripheral points, thus defining the stator-ducts 5. The stator-core carries a stator-winding 7, having end-turns 8.

The stator-frame 3 is associated with two perforated brackets 10 and 11, which are mounted, one at each end of the stator-frame. For economy in manufacture, it is usually desirable that the two brackets 10 and 11 shall be identical. Each bracket is shown as having a registering peripheral portion 13 in air-enclosing relation to that end of the frame-ring 3, and having an adjacent peripheral portion 14 of smaller diameter than said registering peripheral portion 13. Each of the brackets 10 and 11 also has an end-portion 15 which carries a centrally located bearing 16.

The rotor-member 2 has a rotor-core 20, which is provided with a plurality of axially extending rotor-ducts 21. The rotor-member also has a shaft 22 which is supported by the bearings 16. The rotor-core 20 carries a cast squirrel-cage winding 23. By the word "cast," we mean to include brazing or any other forming-process for producing a molecularly integral structure.

In accordance with our invention, we equip the rotor-member 2 with an end-to-end-ventilating exhaust-blower 25, which is illustrated as having a hub-member 26 which is carried by the shaft 22, and as having a blade-supporting shroud 27 which supports a plurality of blades 28, terminating in an outer shroud 29, the inner periphery of which is beaded or otherwise curved, as indicated at 30, so as to follow, or approximately conform to, the flow-lines of the airflow, as described and claimed in an application of Lee A. Kilgore, Serial No. 705,370, filed October 24, 1946, now Patent No. 2,458,006, assigned to the Westinghouse Electric Corporation. In fact, all of the shrouds, blade-shapes and baffles are designed in accordance with the airflow-principles of the Kilgore application.

The ventilating-openings 31 of the bracket 11, at the exhaust-end of the machine, are placed in a row, completely around the smaller-diameter peripheral portion 14 of the bracket, in alignment with the periphery of the blower-blades 28, so that the blower discharges radially outwardly, directly through the bracket-perforations 31. This exhaust-end bracket 11 is also provided with inwardly directed diffuser-forming means 32, associated with its perforations 31, for receiving the air as it leaves the outer periphery of the blower-blades 28, and diffusing it, or spreading it circumferentially, as it flows radially outwardly. In motors which are capable of rotating in either direction, this diffuser-forming means, and the blower-blades 28, must be disposed for radial discharge, rather than discharge at an angle to the radial direction.

To provide a protected machine, in accordance with our invention, we provide a hood 33, at at least said exhaust-end of the machine, said hood having an imperforate peripheral portion 34, surrounding the perforated portion 14—31 of the associated bracket 11, in spaced relation thereto. This hood has an end-portion 36 having perforations 37 therein, these perforations being disposed suitably for providing either a drip-proof or a splash-proof motor.

In many cases, it is desirable to provide two parallel ventilating-paths through the motor, one path through the stator-ducts 5, and the other path through the rotor-ducts 21. In such cases, it is preferably to provide rotor-ventilating blades 40, which are cast integrally on the end-ring of the squirrel-cage winding 23 at one end of the machine, preferably the exhaust-end, for drawing air through the rotor-ducts 21. The ends of the cast squirrel-cage fan blades 40 are preferably associated with a rotating shroud 41, which depends inwardly from said blades and directs the air from the rotor-ducts 21 to the blades 40.

The blades 40 not only draw air through the rotor-ducts, but they also provide a strong blast of air which is delivered radially against the inner periphery of the end-turns 8 of the stator-winding 7, thus strongly cooling the same, at the end of the machine where said cast squirrel-cage rotor-blades 40 are located. In some instances, it may be desirable to provide other similar blades 40a which are cast integrally with the squirrel-cage member 23 at the other end thereof, the blades 40a being preferably smaller than the blades 40, and having no rotating shroud 41 associated therewith. In this manner, a blast of air is directed also against the inner periphery of the stator end-windings 8 at the inlet-end of the machine.

In operation, the air is exhausted entirely around the periphery of the machine, at the exhaust-end bracket, thus making it possible to provide equal ventilation for all portions of the periphery of the stator-core 4. In addition, the air is then turned, and directed axially outwardly of the machine, between the exhaust-end bracket 11 and the exhaust-end hood 34, and the air is then passed through holes 37 which are so placed, in the end of the hood, as to provide the desired kind of protected-motor operation, either drip proof or splash-proof, as may be required. At the same time, means are provided for providing a parallel airflow through the rotor-ducts 21.

For convenience in manufacture, and for symmetry in the general appearance of the motor, as well as for more utilitarian purposes, the same kinds of brackets and hoods may be provided at both ends of the machine, except that the inlet-end bracket 10 need not be provided with the diffuser-forming means 32.

While we have shown our motor in a single illustrative form of embodiment, in accordance with a particular design which seems to be preferable, at present, we wish it to be understood that the invention is not limited to the precise details of disclosure, and we desire that the appended claims shall be accorded the broadest interpretation consistent with their language.

We claim as our invention:

1. A single-end-ventilated dynamo-electric machine, comprising a stator-member and a rotor-member, said stator-member having a stator-frame and a stator-core supported by the stator-frame, the stator-frame comprising an outer enclosure-member spaced radially from the major portion of the outer periphery of the stator-core and thus defining a plurality of axially extending stator-ventilating ducts which admit of an axial air-flow over the stator-core from one end of the core to the other, and a stator-winding carried by the stator-core; two perforated brackets mounted on the stator-frame, one at each end; bearings carried by said perforated brackets; said rotor-member having a rotor-core, and having a shaft which is supported by said bearings; characterized by the bracket at at least the exhaust-end of the machine having a peripheral portion and an end-portion, said exhaust-end bracket having its perforations located exclusively in a row in said peripheral portion; and said rotor-member having a blower located in line with said bracket-openings at the exhaust-end of the machine; and further characterized by said rotor-core having a molecularly integral squirrel-cage winding and having a plurality of rotor-ducts extending axially through said rotor-core, integrally formed fan-blades, molecularly integral with said squirrel-cage winding at one end of the rotor-member, for drawing air through said rotor-ducts, and a rotating shroud associated with the ends of said blades and depending inwardly therefrom for directing the air from the rotor-ducts to said blades.

2. The invention as defined in claim 1, characterized by said fan-blades being at the exhust-end of the rotor-member.

3. A single-end-ventilated dynamo-electric machine, comprising a stator-member and a rotor-member, said stator-member having a stator-frame and a stator-core supported by the stator-frame, the stator-frame comprising an outer enclosure-member spaced radially from the major portion of the outer periphery of the stator-core and thus defining a plurality of axially extending stator-ventilating ducts which admit of an axial airflow over the stator-core from one end of the core to the other, and a stator-winding carried by the stator-core; two perforated brackets mounted on the stator-frame, one at each end; bearings carried by said perforated brackets; said rotor-member having a rotor-core, and having a shaft which is supported by said bearings; characterized by the bracket at at least the exhaust-end of the machine having a registering peripheral portion in air-enclosing relation to that end of the outer enclosure-member, and having an adjacent peripheral portion of smaller diameter than said peripheral portion, said exhaust-end bracket having its perforations located exclusively in said adjacent peripheral portion; a hood at at least said exhaust-end of the machine, said hood having an imperforate peripheral portion surrounding the perforated portion of the associated bracket in spaced relation thereto, and having an end-portion having perforations therein; and said rotor-member having a blower located in line with said bracket-openings at the exhaust-end of the machine.

4. The invention as defined in claim 3, characterized by said exhaust-end bracket having inwardly directed diffuser-forming means, associated with its perforations.

5. The invention as defined in claim 3, characterized by said rotor-core having a molecularly integral squirrel-cage winding and having integrally formed fan-blades, molecularly integral with said squirrel-cage winding, for assisting in ventilating the end-windings of said stator-winding.

6. The invention as defined in claim 3, characterized by said rotor-core having a molecularly integral squirrel-cage winding and having a plurality of rotor-ducts extending axially through said rotor-core, integrally formed fan-blades, molecularly integral with said squirrel-cage winding at one end of the rotor-member, for drawing air through said rotor-ducts, and a rotating shroud associated with the ends of said blades and depending inwardly therefrom for directing the air from the rotor-ducts to said blades.

7. The invention as defined in claim 3, characterized by said rotor-core having a molecularly integral squirrel-cage winding and having a plurality of rotor-ducts extending axially through said rotor-core, integrally formed fan-blades, molecularly integral with said squirrel-cage winding at the exhaust-end of the rotor-member, for drawing air through said rotor-ducts, and a rotating shroud associated with the ends of said blades and depending inwardly therefrom for directing the air from the rotor-ducts to said blades.

WARD D. ABBOTT.
FRANK C. RUSSELL.

REFERENCES CITED

The following references are of record in the file of this patent:

UNITED STATES PATENTS

| Number | Name | Date |
|---|---|---|
| 1,360,482 | Wiard | Nov. 30, 1920 |
| 1,551,236 | Carter | Aug. 25, 1925 |
| 1,920,309 | Hoseason | Aug. 1, 1933 |
| 1,996,460 | Coates | Apr. 2, 1935 |
| 2,055,931 | Keely | Sept. 29, 1936 |
| 2,286,750 | McMahon | June 16, 1942 |

FOREIGN PATENTS

| Number | Country | Date |
|---|---|---|
| 290,043 | Great Britain | May 10, 1928 |
| 370,312 | Great Britain | Apr. 7, 1932 |
| 390,291 | Great Britain | Apr. 6, 1933 |